US006816288B1

(12) United States Patent
Hashizume

(10) Patent No.: US 6,816,288 B1
(45) Date of Patent: Nov. 9, 2004

(54) IMAGE READING APPARATUS AND IMAGE READING METHOD

(75) Inventor: Yusuke Hashizume, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/708,438

(22) Filed: Nov. 9, 2000

(51) Int. Cl.[7] ........................... H04N 1/04; H04N 1/36; G06K 9/32
(52) U.S. Cl. ...................... 358/474; 358/412; 382/298; 382/299
(58) Field of Search ............................... 358/412, 474; 382/298, 299

(56) References Cited

U.S. PATENT DOCUMENTS

| | | | |
|---|---|---|---|
| 5,157,515 A | 10/1992 | Hasegawa | |
| 6,009,292 A | * 12/1999 | Jinbo et al. | .................. 399/208 |
| 6,490,057 B1 | * 12/2002 | Sakaguchi | .................. 358/412 |

FOREIGN PATENT DOCUMENTS

| | | |
|---|---|---|
| JP | 64-51866 A | 2/1989 |
| JP | 2-16582 A | 1/1990 |
| JP | 2-41698 A | 2/1990 |
| JP | 3-198470 A | 8/1991 |
| JP | 5-300796 A | 11/1993 |
| JP | 8-81229 | 10/1994 |
| JP | 9-261996 | 10/1997 |
| JP | 11-202564 A | 7/1999 |

* cited by examiner

Primary Examiner—Edward Coles
Assistant Examiner—H. Safaipour
(74) Attorney, Agent, or Firm—Foley & Lardner LLP

(57) ABSTRACT

Where a magnification (enlargement/reduction of image) has been set through operation keys of an operation panel, a main CPU sends information on read magnification to a scanner CPU of a scanner section. In this case, where the magnification is not set in particular, information of 100% magnification is sent to the scanner CPU. Based on a microstep division number of a step angle corresponding to the received information on read magnification, the scanner CPU controls the driving of a scan motor via a scan motor driver.

20 Claims, 6 Drawing Sheets

| SCAN MAGNIFICATION | 50%-86% | 87%-122% | 123%-200% |
|---|---|---|---|
| SPEED (PPS) | 9772-5681 | 2780-2000 | 3972-2443 |
| MICROSTEP DIVISION NUMBER | 1/8step (2W1-2 PHASE EXCITATION) | 1/4step (W1-2 PHASE EXCITATION) | 1/8step (2W1-2 PHASE EXCITATION) |

IMAGE READING APPARATUS AND IMAGE READING METHOD

BACKGROUND OF THE INVENTION

The present invention relates to an image reading apparatus, such as a scanner, for optically reading an original by driving a scanning optical system using a pulse-controlled motor.

There is known an image reading apparatus, such as a scanner section of a copying machine or a scanner, for optically reading an original by driving a scanning optical system using a pulse-controlled motor, such as a stepping motor or an encoder-equipped DC servomotor, whose rotation amount or rotation speed can be controlled by a pulse number or a pulse cycle.

In the image reading apparatus for optically reading an original by driving a scanning optical system using a pulse-controlled motor, the pulse (stepping) motor is controlled at the time of reading/scanning in a microstep driving mode by increasing/decreasing a division number in accordance with an enlargement/reduction magnification of an image.

Jpn. Pat. Appln. KOKOKU Publication No. 6-81229, for instance, discloses that a pulse division number for microstep driving is made greater than that for one magnification at the time of image enlargement, and made less than that for one magnification at the time of image reduction. Specifically, the pulse-controlled motor is microstep-driven by increasing/decreasing the division number in accordance with the enlargement/reduction of image.

In the above-described pulse motor driving control, the division number is normally set to be successively increase as the reading magnification is varied from the enlargement side to the reduction side.

In the conventional image reading apparatus, a carriage (a moving member integrated with a mirror, a light source, etc.) which scans an original in units of a line in a main scan direction is moved in a sub-scan direction, thereby reading the entire original. The carriage of the image reading apparatus, which moves in the sub-scan direction, is accelerated by a motor up to a predetermined scanning speed in accordance with a scanning magnification, and the carriage is then moved at the predetermined scanning speed to read the original.

Although the carriage for scanning is driven by the stepping motor (pulse motor) to read the image, a torque variation occurs due to each pulse for driving the stepping motor. A vibration due to the torque variation may affect the carriage and degrade the quality of the read image.

The conventional stepping motor is driven by a half-step driving method or a microstep driving method, instead of a standard full-step driving method. Thereby, the frequency of drive pulses is increased and the amount of movement per pulse is decreased. Thus, the variation in torque is decreased, and the torque variation due to the motor is reduced. According to the adopted motor driving method, the frequency of drive pulses is highest in a range permitted by hardware and software.

However, where the rotation speed of the motor varies in accordance with the read magnification, the motor is driven with smaller drive steps at the time of low-speed rotation, and with larger drive steps at the time of high-speed rotation than at the time of the low-speed rotation, because of restrictions in hardware and software.

In the prior art and the above-described driving method, where the motor is driven with smaller step angles at the time of low-speed rotation than at the time of high-speed rotation ("microstep driving"), the vibration may increase in some cases by the microstep driving (i.e. by increasing the division number).

Furthermore, in some cases, the stepping motor may resonate at a certain frequency, increasing the vibration and noise and decreasing the torque.

BRIEF SUMMARY OF THE INVENTION

The object of the present invention is to provide an image reading apparatus and an image reading method wherein when a microstep driving control is performed, the step angle is varied at random, thereby suppressing vibration, preventing a decrease in torque, and providing high-quality images.

In order to achieve the object, according to the invention, there is provided an image reading apparatus for optically reading an original by driving a scan optical system using a pulse-controlled motor, wherein an optimal division number corresponding to a magnification of image, such as a magnification for enlargement of image, a magnification equal to a size of the original, or a magnification for reduction of image, is selected at random for the motor at a time of read scan, thus controlling microstep driving.

There is also provided an image reading apparatus for optically reading an original by driving a scan optical system using a pulse-controlled motor, the apparatus comprising:

a setting section for setting a magnification of image, such as a magnification for enlargement of image, a magnification equal to a size of the original, or a magnification for reduction of image; and a control section for selecting an optimal division number for the motor at a time of read scan at random from among a plurality of division number candidates in accordance with the magnification of image, such as a magnification for enlargement of image, a magnification equal to a size of the original, or a magnification for reduction of image, which has been set by the setting section, thus controlling microstep driving.

There is also provided an image reading method for optically reading an original by driving a scan optical system using a pulse-controlled motor, wherein an optimal division number corresponding to a magnification of image, such as a magnification for enlargement of image, a magnification equal to a size of the original, or a magnification for reduction of image, is selected at random for the motor at a time of read scan, thus controlling microstep driving.

BRIEF DESCRIPTION OF SEVERAL VIEWS OF THE DRAUING

DETAILED DESCRIPTION OF THE INVENTION

An embodiment of the present invention will now be described with reference to the accompanying drawings.

Figure 1:
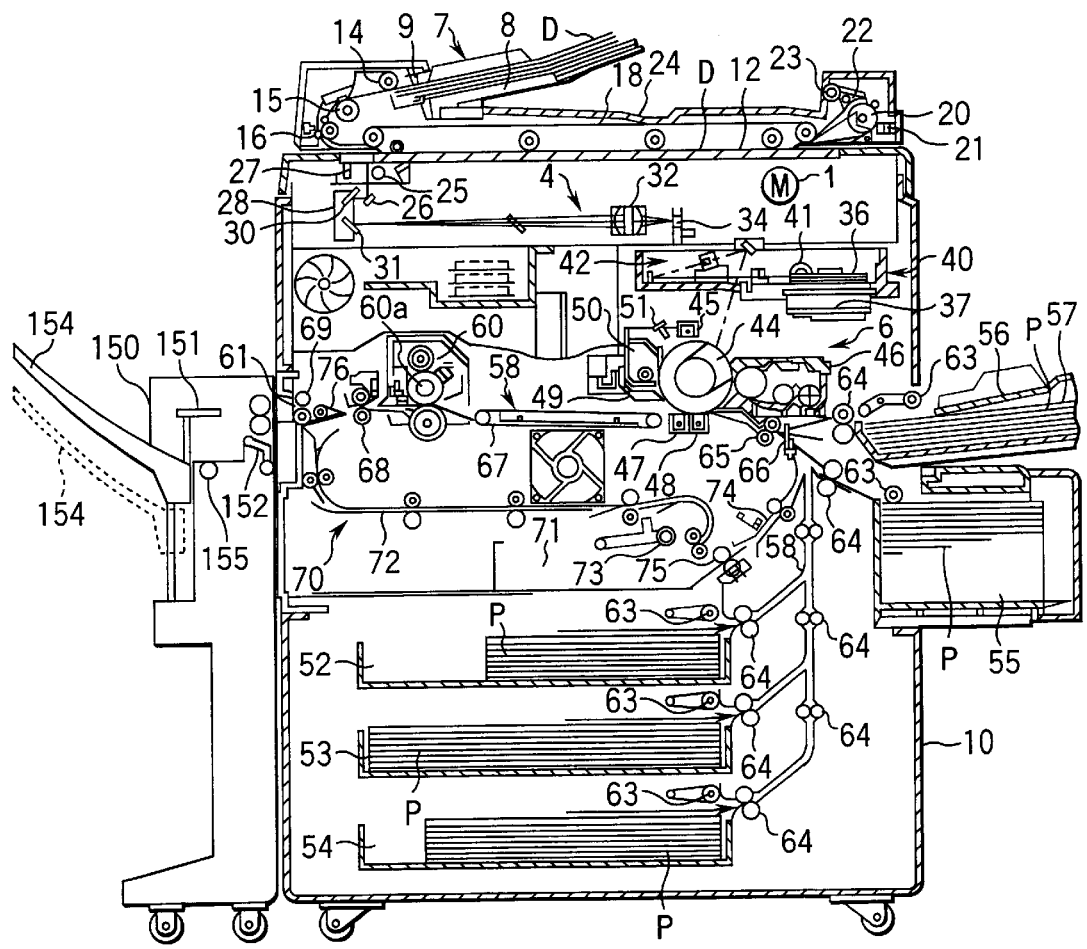
FIG. 1 shows an internal structure of a digital copying machine having an image reading apparatus according to the present invention.

FIG. 1 shows an internal structure of a digital copying machine having a scanner section as an image reading apparatus according to the present invention.

In FIG. 1, reference numeral 10 denotes an apparatus main body. The apparatus main body 10 incorporates a scanner section 4 functioning as an image reading apparatus, a printer section 6 functioning as an image output means, and a finisher 150 as an option.

An original table 12 formed of transparent glass, on which a read object, i.e. an original D is placed, is disposed on the upper surface of the apparatus main body 10. An automatic document feeder 7 (hereinafter referred to as "ADF") for automatically feeding originals D onto the original table 12 is disposed on the upper surface of the apparatus main body 10. The ADF 7 is disposed to be opened/closed with respect to the original table 12 and serves as an original cover for bringing the original D placed on the original table 12 into close contact with the original table 12.

The scanner section 4 provided in the apparatus main body 10 has an exposure lamp 25 as a light source for illuminating the original D placed on the original table 12, and a first mirror 26 for deflecting reflection light from the original D in a predetermined direction. The exposure lamp 25 and first mirror 26 are attached to a first carriage 27 disposed under the original table 12. The first carriage 27 is disposed to be movable in parallel to the original table 12 and reciprocally moved under the original table 12 by a scan motor 1 through a toothed belt (not show), etc. A stepping motor is used as the scan motor 1, as will be described later in detail.

A second carriage 28 movable in parallel to the original table 12 is disposed under the original table 12. Second and third mirrors 30 and 31 for successively deflecting reflection light from the original D, which has been deflected by the first mirror 26, are attached to the second carriage 28 at right angles with each other. The second carriage 28 is moved by, e.g. the toothed belt for driving the first carriage 27 along with the first carriage 27, and moved in parallel along the original table 12 at half the speed of the first carriage.

A focusing lens 32 for focusing reflection light from the third mirror 31 mounted on the second carriage 28, and a CCD line sensor 34 serving as photoelectric conversion means for receiving the reflected light focused by the focusing lens 32 and photoelectrically converting it are also disposed under the original table 12. The focusing lens 32 is disposed in a plane including the optical axis of the light deflected by the third mirror 31 so as to be movable by means of a driving mechanism. The focusing lens 32 moves to focus the reflection light at a desired magnification. The line sensor 34 photoelectrically converts the incoming reflection light and outputs an electrical signal corresponding to the read original D.

A description of the printer section 6 may be omitted since it does not directly relate to the subject matter of the present invention.

Figure 2:
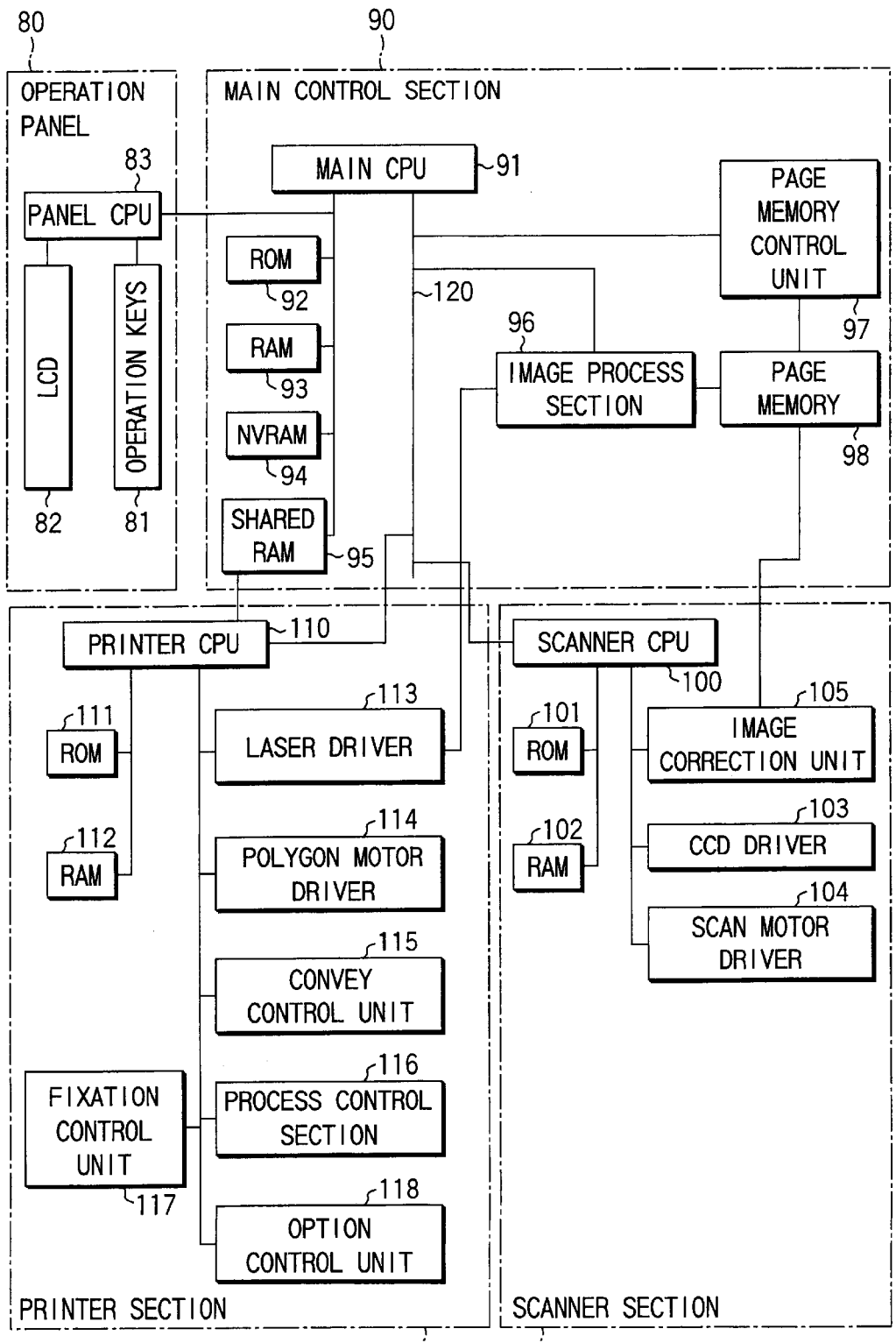
FIG. 2 is a block diagram schematically showing electrical connection in the digital copying machine shown in FIG. 1 and flow of signals for control.

FIG. 2 is a block diagram schematically showing electrical connection of the digital copying machine shown in FIG. 1 and flow of signals for control. In FIG. 2, a control system comprises three CPUs (Central Control Units): a main CPU 91 provided in a main control section 90; a scanner CPU 100 in the scanner section 4; and a printer CPU 110 in the printer section 6. These CPUs are connected by a shared bus 120.

The main CPU 91 performs bi-directional communication with the printer CPU 110 via a shared RAM 95. The main CPU 91 issues an operational instruction, and the printer CPU 110 returns status data. Serial communication is performed between the printer CPU 110 and scanner CPU 100. The printer CPU 110 issues an operational instruction, and the scanner CPU 100 returns status data.

The shared bus 120 is a complete sync bus, like a PCI bus. In the shared bus 120, a single signal line is shared by an address bus and a data bus in a time-division manner. A peripheral device for program I/O transfer via the CPUs serves as a bus master for controlling the shared bus. Data transfer by the bus master, in which a memory, etc. are directly accessed, is possible.

An operation panel 80 comprises various operation keys 81, a liquid crystal display 82, and a panel CPU 83 to which the LCD 82 and operation keys 81 are connected. The operation panel 80 is connected to the main CPU 91.

The main control section 90 comprises the main CPU 91, a ROM 92, a RAM 93, an NVRAM 94, shared RAM 95, an image process section 96, a page memory control unit 97, and a page memory 98.

The main CPU 91 controls the entirety of the main control section 90. The ROM 92 stores control programs, etc. for the main CPU 91. The RAM 93 temporarily stores various data.

The NVRAM (Non-Volatile RAM) 94 is a non-volatile memory backed up by a battery (not shown). Even when power is not supplied to the NVRAM 34, stored data is maintained.

The shared RAM 95 is used to perform bi-directional communication between the main CPU 91 and printer CPU 110.

The page memory control unit 97 stores and reads out image information in and from the page memory 98. The page memory 98 has areas capable of storing image information of a plurality of pages. The page memory 98 can store compressed data in units of a page, which is obtained by compressing image information from the scanner section 4.

The scanner section 4 comprises the scanner CPU 100 for controlling the entirety of the scanner section 4; a ROM 101 storing control programs, etc.; a data storage RAM 102; a CCD driver 103 for driving the line sensor 34; a scan motor driver 104 for controlling the rotation of the scan motor 1 for moving the exposure lamp 25, mirrors 26, 27 and 28, etc.; and an image correction unit 105.

The image correction section 105 comprises an A/D converter for converting analog signals output from the line sensor 34 to digital signals; a shading correction circuit for correcting a variance in the line sensor 34, or a variation in threshold level due to ambient temperature variation relative to the output signal from the line sensor 34; and a line memory for temporarily storing shading-corrected digital signals from the shading correction circuit.

A description of the printer section 6 may be omitted since it does not directly relate to the subject matter of the present invention.

The driving of the scan motor 1 in the scanner section 4 will now be described.

A currently dominant method for five-phase microstep driving of the stepping motor used as the scan motor 1 is a pentagon method or a new pentagon method, rather than a five-phase bipolar method.

Figure 3:
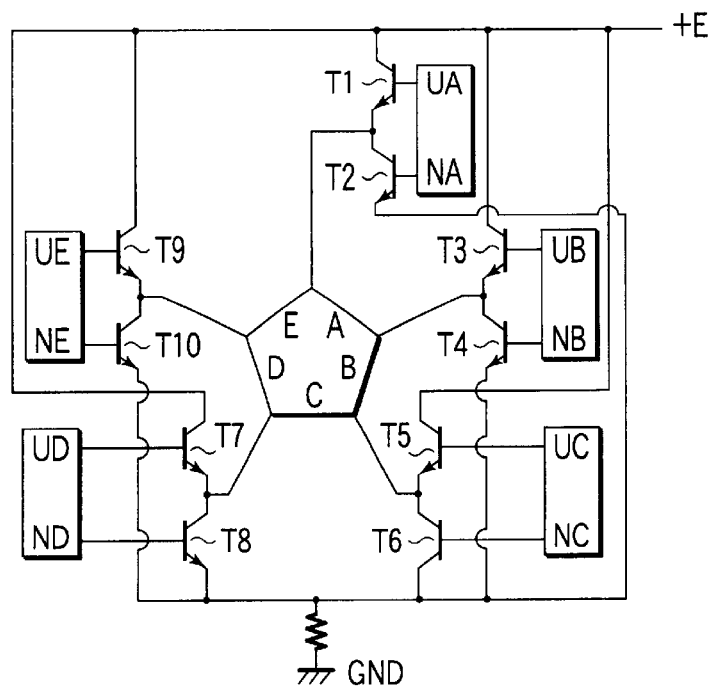
FIG. 3 shows an example of a five-phase stepping motor driving circuit.

FIG. 3 shows an example of a five-phase stepping motor driving circuit. The motor driving circuit shown in FIG. 3 is a basic circuit of the pentagon method. This basic circuit comprises transistors T1 and T2 and bridge elements (UA, NA); transistors T3 and T4 and bridge elements (UB, NB); transistors T5 and T6 and bridge elements (UC, NC); transistors T7 and T8 and bridge elements (UD, ND); and transistors T9 and T10 and bridge elements (UE, NE).

Since a current control for each phase is not performed in the pentagon method, a control for division is effected not by a current but by a time control of ON/OFF duty of the five-phase bridge element (U, N).

Figure 4:
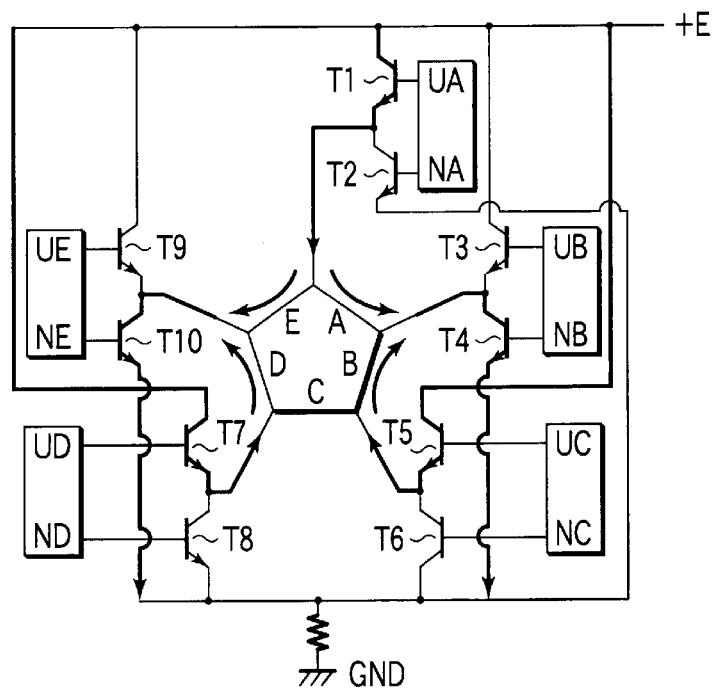
FIG. 4 shows current paths at the time of four-phase excitation.

FIG. 4 shows current paths at the time of four-phase excitation. In FIG. 4, phases A, B, D and E of a motor are excited. Switching elements UA, NB, UC, UD and NE are turned on, and switching elements NA, UB, NC, ND and UE are turned off. Specifically, a current flows from a transistor T1 to a transistor T4 via the phase A of the motor, thus exciting the phase A of the motor. A current flows from a transistor T5 to the transistor T4 via the phase B of the motor, thus exciting the phase B of the motor. A current flows from a transistor T7 to a transistor T10 via the phase D of the motor, thus exciting the phase D of the motor. A current flows from the transistor T1 to the transistor T10 via the phase E of the motor, thus exciting the phase E of the motor.

Figure 5:
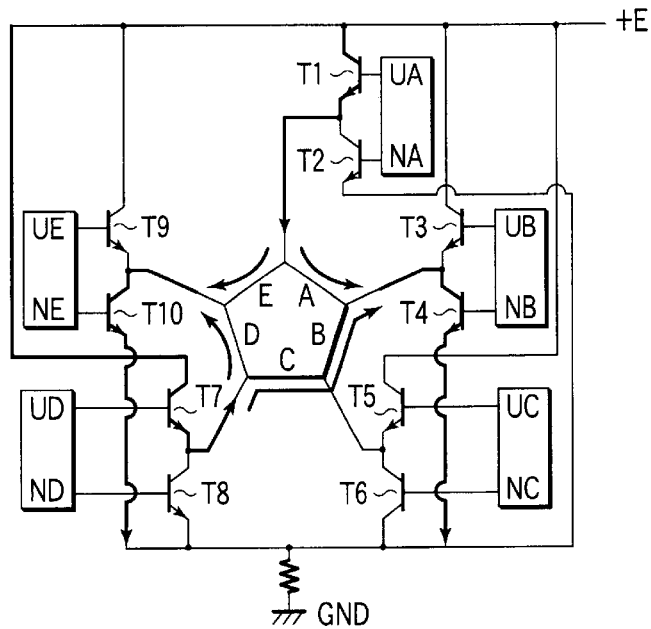
FIG. 5 shows current paths at the time of five-phase excitation.

FIG. 5 shows current paths at the time of five-phase excitation. In FIG. 5, phases A, B, C, D and E of a motor are excited. Switching elements UA, NB, UD and NE are turned on, and switching elements NA, UB, UC, NC, ND and UE are turned off. Specifically, a current flows from a transistor T1 to a transistor T4 via the phase A of the motor, thus exciting the phase A of the motor. A current flows from a transistor T7 to the transistor T4 via the phases C and B of the motor, thus exciting the phases B and C of the motor. A current flows from the transistor T7 to a transistor T1 via the phase D of the motor, thus exciting the phase D of the motor. A current flows from the transistor T1 to the transistor T10 via the phase E of the motor, thus exciting the phase E of the motor.

In the present invention, using the excitation states shown in FIGS. 4 and 5, the excitation is advanced in the order of the four phases→the five phases→the four phases, and thus half-step driving is realized.

Figure 6:
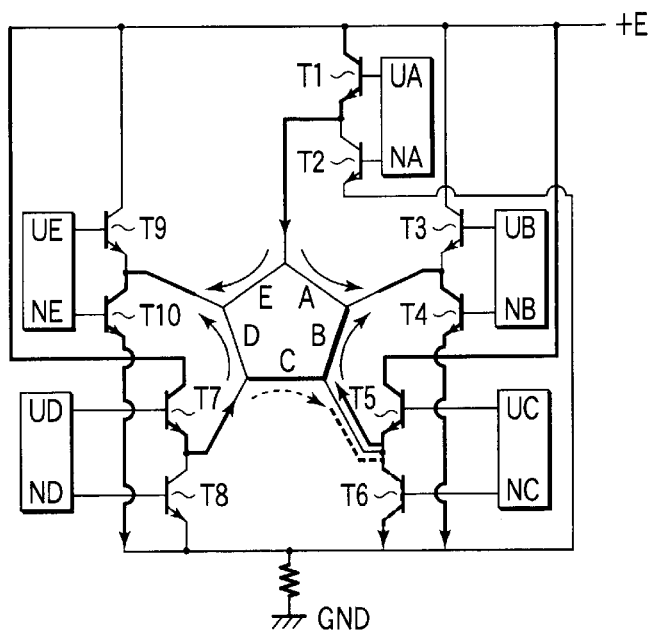
FIG. 6 is a view for explaining an ON/OFF control performed at a duty ratio of 50%.
Figure 7:
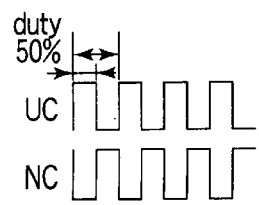
FIG. 7 is a view for explaining an ON/OFF control performed at a duty ratio of 50%.

In the microstep half-step driving, unlike the above-described standard method, the switching elements UC and NC are turned on/off at a duty ratio of 50% at the time of half-step five-phase excitation, as shown in, e.g. FIGS. 6 and 7. A control for enhancing a resolution can be effected by varying the duty ratio in accordance with the resolution.

Specifically, a current flows from the transistor T1 to the transistor T4 via the phase A of the motor, thus exciting the phase A of the motor. A current flows from the transistor T5, which is on/off controlled by the switching element UC at a duty ratio of 50%, to the transistor T4 via the phase B of the motor, thus exciting the phase B of the motor. A current flows from the transistor T7, which is on/off controlled by the switching element NC at a duty ratio of 50%, to a transistor T6 via the phase C of the motor, thus exciting the phase C of the motor. A current flows from the transistor T7 to the transistor T10 via the phase D of the motor, thus exciting the phase D of the motor. A current flows from the transistor T1 to the transistor T10 via the phase E of the motor, thus exciting the phase E of the motor.

An ordinary stepping motor has a characteristic frequency due to a magnetic spring of the rotor, and a natural frequency is determined by an equation below on the basis of the relationship among a motor torque, a load inertia and a rotor inertia:

$$f[\text{Hz}] = \frac{1}{2\pi}\sqrt{\frac{ZR \times TH \times g}{JO + JL}}$$

f: natural frequency [Hz]
ZR: number of rotor teeth
TH: maximum excitation torque [kg·cm]
JO: rotor inertia [kg·cm]
JL: load inertia [kg·cm]

Where the frequency component and driving frequency coincide due to the sub-scan magnification of the image reading apparatus, resonant vibration occurs in the stepping motor. In the microstep half-step driving mode, the current ratio of the phases B and C in FIG. 3 is varied due to the resonance at the time of 50% duty control, and a torque variation of the stepping motor increases. Thus, the vibration is further increased (excited).

The same applies not only to the microstep half-step driving but also to microstep ¼ step driving. In this case, a control based on duty ratios of 75% and 25% and a control based on a duty ratio of 25% and 75% are added.

The phenomenon described above in detail is directed to the five-phase stepping motor pentagon driving circuit. This is an example of the motor driving circuit/method. Needless to say, the same applies to, for example, a two-phase microstep driving method and a three-phase microstep driving method.

For such cases, the microstep division number is altered in the present invention.

In the meantime, there is a common idea that if one step angle of the stepping motor is decreased, smooth small-angle driving can be performed and vibration decreases.

However, since the vibration level (resonance region) of the stepping motor varies due to the microstep division number even if the speed (rotation speed) is the same, the vibration level can be improved not only by decreasing the step angle but also by increasing the step angle.

The present invention does not adopt the control based on the common idea that as one step angle of the stepping motor is decreased, smoother small-angle driving can be performed and less vibration occurs. In this invention, a control in a resonance region is avoided by using optimal step angles at random, and influence on image reading due to the characteristic frequency of the stepping motor is eliminated.

Specifically, a region of speed of a stepping motor, where resonance occurs, is determined by a frequency (rotation speed). By varying a division number of microsteps, that region of speed will vary. In the present invention, making use of this feature, the microstep division number is decreased (i.e. the step angle is increased) or increased (i.e.

the step angle is decreased) at random in accordance with the frequency. Thereby, resonant vibration of the stepping motor is avoided.

A more detailed description will now be given.

Figure 8:
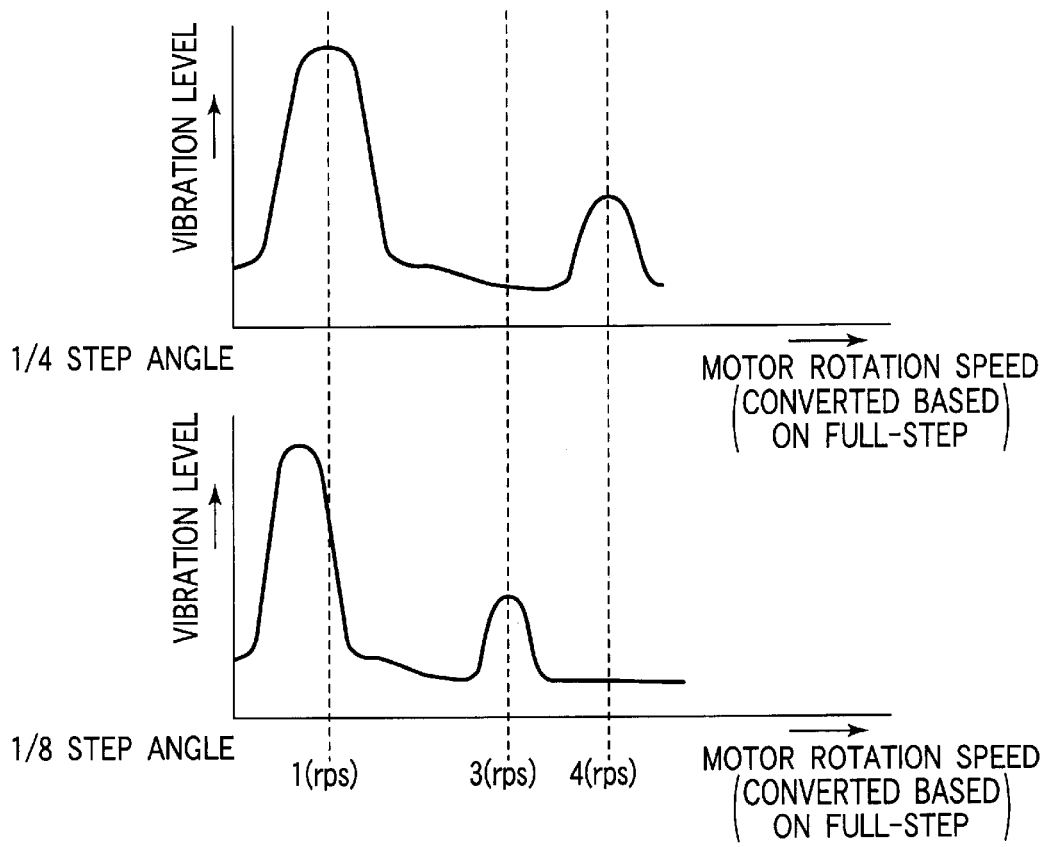
FIG. 8 is a graph showing a relationship between a motor rotation speed and a vibration level in accordance with a step angle in a microstep driving control.

FIG. 8 is a graph showing a relationship between a motor rotation speed and a vibration level in accordance with a step angle in a microstep driving control. In the microstep driving control, it may be considered that a ⅛ step angle is more advantageous than a ¼ step angle with respect to vibration. In fact, however, as shown in FIG. 8, when the motor rotation speed is 3 (rps), the vibration level becomes higher with the ⅛ step angle than with the ¼ step angle.

For example, where the original scan speed of the image reading apparatus is about 4 cpm, the read magnification is 50% to 200% and the amount of movement per step is 0.033843135 mm/step at the time of full step, there is no problem with the microstep driving control with the ⅛ step angle in the range of 50% to 200%. However, where the motor having the characteristics as shown in FIG. 8 is used, the motor vibration level deteriorates at a magnification near 100% (about 87%–122%) and adversely affects the image quality.

In the prior art, an output signal of a CPU is directly used as a signal pulse to be input to the drive control circuit of the stepping motor. The CPU used for the stepping motor, however, requires a process time of 100 μsec for generating one signal pulse, and the maximum driving frequency of signal pulses generated by the CPU is considered to be 10000 pps. If a CPU having a higher processing performance is used, the maximum driving frequency can be increased. Such a CPU, however, is not practical since it is too expensive to be used to drive and control the motor.

From the standpoint of processing performance of the CPU, the step angle cannot be further decreased at the magnification near 100% (about 87%–122%). Thus, in the prior art, a damper, etc. is attached to the motor to decrease its natural frequency, thereby eliminating as much as possible the effect of oscillation. In this case, too, however, the provision of the damper, etc. increases the cost and makes it impossible to provide an inexpensive image reading apparatus.

Figure 9:
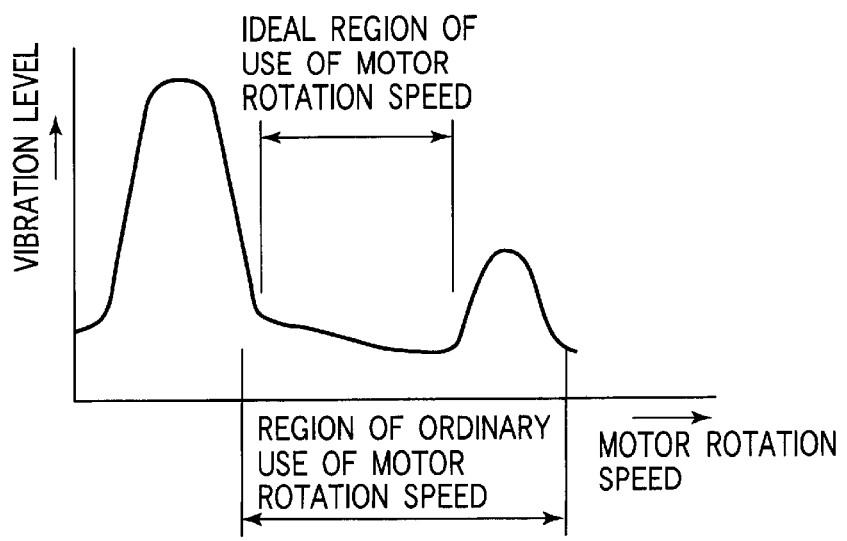
FIG. 9 is a graph for explaining an increase in resonant vibration.

As is shown in FIG. 9, the stepping motor has such a characteristic that resonance occurs at a certain frequency and the vibration thereof increases. As is shown in FIG. 9, an ideal region of use of motor rotation speed can be set from the vibration level of the stepping motor. However, a region of ordinary use of motor ration speed includes a region where the vibration increases to due resonance.

No problem arises if the range of speed (magnification) of the stepping motor used in the image reading apparatus can be set to avoid the resonance vibration frequency. In normal cases, however, the resonance vibration frequency of the stepping motor cannot be avoided due to restrictions relating to the deceleration ratio, scan speed, read magnification range, performance of control ICs, etc.

Figures 10, 11:
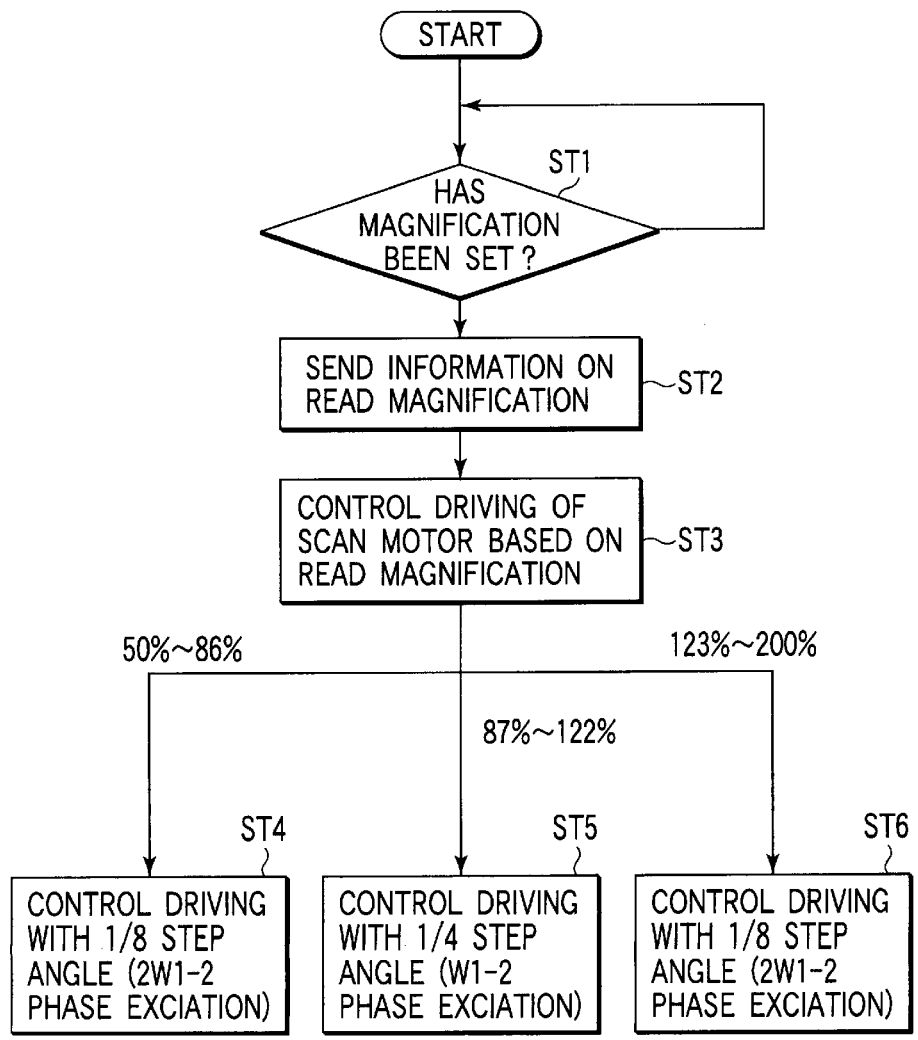
FIG. 10 is a view for explaining a microstep division number relative to a magnification.
FIG. 11 is a flow chart illustrating a scan motor driving control.

In the present invention, the microstep division number is decreased only in a region where the effect of vibration may occur. As is shown in FIG. 10, in the image reading apparatus with an original read speed of about 4 cpm, a ⅛ step angle (2W1-2 phase excitation) is used in the range of read magnification of 50%–80%; a ¼ step angle (W1-2 phase excitation) is used in the range of read magnification of 87%–122%; and a ⅛ step angle (2W1-2 phase excitation) is used in the range of read magnification of 123%–200%. With this setting, the driving of the stepping motor is controlled.

Referring now to a flow chart of FIG. 10, a description will be given of the driving control of the scan motor 1 in the scanner section 4 having the above-described structure.

To start with, where the magnification (enlargement/reduction of image) has been set through the operation keys 81 of operation panel 80 (ST1), the CPU 91 sends the information on read magnification to the scanner CPU 100 of scanner section 4 (ST2). In this case, where the magnification is not set in particular, information of 100% magnification is sent to the scanner CPU 100.

Based on the received information on read magnification, the scanner CPU 100 controls the driving of the scan motor 1 via the scan motor driver 104 (ST3).

Where the read magnification range is 50%–86%, the scanner CPU 100 controls the driving of the scan motor 1 with the ⅛ step angle (2W1-2 phase excitation) (ST4). Where the read magnification range is 87%–122%, the scanner CPU 100 controls the driving of the scan motor 1 with the ¼ step angle (W1-2 phase excitation) (ST5). Where the read magnification range is 123%–200%, the scanner CPU 100 controls the driving of the scan motor 1 with the ⅛ step angle (2W1-2 phase excitation) (ST6).

Where the read magnification is in the range of 50% to 400%, it is possible to control the driving of the scan motor 1 with a ¼ step angle in the range of 201%–299% and with a 1/16 step angle in the range of 300%–400%, in addition to controlling the driving of the scan motor 1 with the ⅛ step angle in the range of 50%–86%, with the ¼ step angle in the range of 87%–122%, and with the ⅛ step angle in the range of 123%–200%.

As has been described above, according to the embodiment of the present invention, the microstep driving control is used and the step angle is not merely decreased (i.e. the step angle is regularly divided) but is varied at random, thereby suppressing vibration and providing a high-quality image at low cost.

What is claimed is:

1. An image reading apparatus for optically reading an original by driving a scan optical system using a pulse-controlled motor, wherein a microstep division number, which prevents the motor from being driven in resonance regions corresponding to different microstep division numbers of the motor, is selected at random when the motor drives the scan optical system in accordance with a magnification of image, such as a magnification for enlargement of image, a magnification equal to a size of the original, or a magnification for reduction of image, and the selected microstep division number is used for controlling microstep driving of the motor.

2. An image reading apparatus for optically reading an original by driving a scan optical system using a pulse-controlled motor, the apparatus comprising:

a setting section for setting a magnification of image, such as a magnification for enlargement of image, a magnification equal to a size of the original, or a magnification for reduction of image; a first control section for selecting a microstep division number, which prevents the motor from being driven in resonance regions corresponding to different microstep division numbers of the motor, when the motor drives the scan optical system in accordance with the magnification of image, such as a magnification for enlargement of image, a magnification equal to a size of the original, or a magnification for reduction of image; and a second control section for controlling microstep driving of the motor using the microstep division number selected by the first control section.

3. An image reading apparatus according to claim 2, wherein said control section is a CPU for controlling an entirety of the image reading apparatus.

4. An image reading apparatus according to claim 2, wherein said setting section sets enlargement/reduction input through operation keys of an operation panel and sets one magnification where enlargement/reduction is not input through the operation keys.

5. An image reading apparatus according to claim 2, wherein said first control section selects the microstep division number at random from among the microstep division number candidates consisting of a ¼ step angle and a ⅛ step angle.

6. An image reading apparatus according to claim 2, wherein said first control section selects the microstep division number at random from among the microstep division number candidates consisting of a ¼ step angle, a ⅛ step angle and a ¹⁄₁₆ step angle.

7. An image reading apparatus according to claim 2, wherein said first control section divides an image magnification range into a plurality of blocks in advance, and predetermines microstep division numbers for the respective blocks, the predetermined microstep division numbers preventing the motor from being driven in resonance regions corresponding to different microstep division numbers of the motor.

8. An image reading apparatus according to claim 2, wherein said first control section selects a microstep division number of a ⅛ step angle for a block of magnification of 50%–86%, a microstep division number of a ¼ step angle for a block of magnification of 87%–122%, and a microstep division number of a ⅛ step angle for a block of magnification of 123%–200%.

9. An image reading apparatus according to claim 2, wherein said first control section selects a microstep division number of a ⅛ step angle for a block of magnification of 50%–86%, a microstep division number of a ¼ step angle for a block of magnification of 87%–122%, a microstep division number of a ⅛ step angle for a block of magnification of 123%–200%, a microstep division number of a ¼ step angle for a block of magnification of 201%–299%, and a microstep division number of ¹⁄₁₆ step angle for a block of magnification of 300%–400%.

10. An image reading method for optically reading an original by driving a scan optical system using a pulse-controlled motor, wherein a microstep division number, which prevents the motor from being driven in resonance regions corresponding to microstep division numbers of the motor, is selected at random when the motor drives the scan optical system in accordance with a magnification of image, such as a magnification for enlargement of image, a magnification equal to a size of the original, or a magnification for reduction of image, and the selected miscrostep division number is used for controlling microstep driving of the motor.

11. An image reading apparatus for optically reading an original by driving a scan optical system, comprising:

a pulse controlled motor which drives said scan optical system; and a processing unit which selects a stepping angle of a pulse and supplies the pulse to said pulse controlled motor in accordance with an image reading magnification and a natural frequency of said pulse controlled motor, wherein the stepping angle is selected according to a microstep division number, the microstep division number selected at random when the motor drives the scan optical system in accordance with the image reading magnification so as to prevent the motor from being driven in resonance regions corresponding to different microstep division numbers of the motor.

12. An image reading apparatus for optically reading an original by driving a scan optical system, comprising:

a pulse controlled motor which drives said scan optical system; and a processing unit which selects a microstep division number of dividing a pulse for said pulse controlled motor so as to prevent the motor from being driven in resonance regions corresponding to different microstep division numbers of the motor, and supplies the pulse to said pulse controlled motor in accordance with an image reading magnification, when the image reading magnification increases in a monotone, the microstep divisional number corresponding to each magnification does not increase in a monotone.

13. An image reading apparatus according to claim 12, wherein said processing unit selects the microstep division number of dividing a pulse from among the number candidates 4n, n being a natural number.

14. An image reading apparatus according to claim 12, wherein said processing unit divides an image magnification range into a plurality of blocks in advance, and selects the microstep division number of dividing a pulse for the respective blocks.

15. An image reading apparatus for optically reading an original by driving a scan optical system, comprising:

a pulse controlled motor which drives said scan optical system; and a processing unit which selects a microstep division number of dividing a pulse for said pulse controlled motor so as to prevent the motor from being driven in resonance regions corresponding to different microstep division numbers of the motor, in accordance with an image reading magnification and supplies the pulse to said pulse controlled motor, said processing unit selects a first microstep division number of dividing a pulse for a first magnification, selects a second microstep division number of dividing a pulse for a second magnification, and selects a third microstep division number of dividing a pulse for a third magnification; and the microstep division numbers and magnifications satisfied a formula as follows:

$$a<b<c$$

a: first magnification,
b: second magnification,
c: third magnification, $$x>y, z>y$$

x: first microstep division number of dividing a pulse,
y: second microstep division number of dividing a pulse, and
z: third microstep division number of dividing a pulse.

16. A pulse controlled motor driving method for optically reading an original by driving a scan optical system, comprising:

selecting a microstep division number of dividing a pulse for said pulse controlled motor so as to prevent the motor from being driven in resonance regions corresponding to different microstep division numbers of the motor; and supplying the pulse to said pulse controlled motor in accordance with an image reading magnification, when the image reading magnification increases in a monotone, the microstep division number of dividing a pulse corresponding to each magnification does not increase in a monotone.

17. An image reading apparatus according to claim 1, wherein, the selected microstep division number decreases as the magnification increases and then increases as the magnification increases further.

18. An image reading apparatus according to claim 2, wherein, the selected microstep division number decreases as the magnification increases and then increases as the magnification increases further.

19. An image reading method according to claim 10, wherein, the selected microstep division number decreases as the magnification increases and then increases as the magnification increases further.

20. An image reading apparatus according to claim 11, wherein, the selected microstep division number decreases as the magnification increases and then increases as the magnification increases further.

* * * * *